July 27, 1954
C. E. CALVIN
2,684,710
SCREW ACTUATED TIRE BEAD LOOSENING TOOL
Filed July 21, 1952
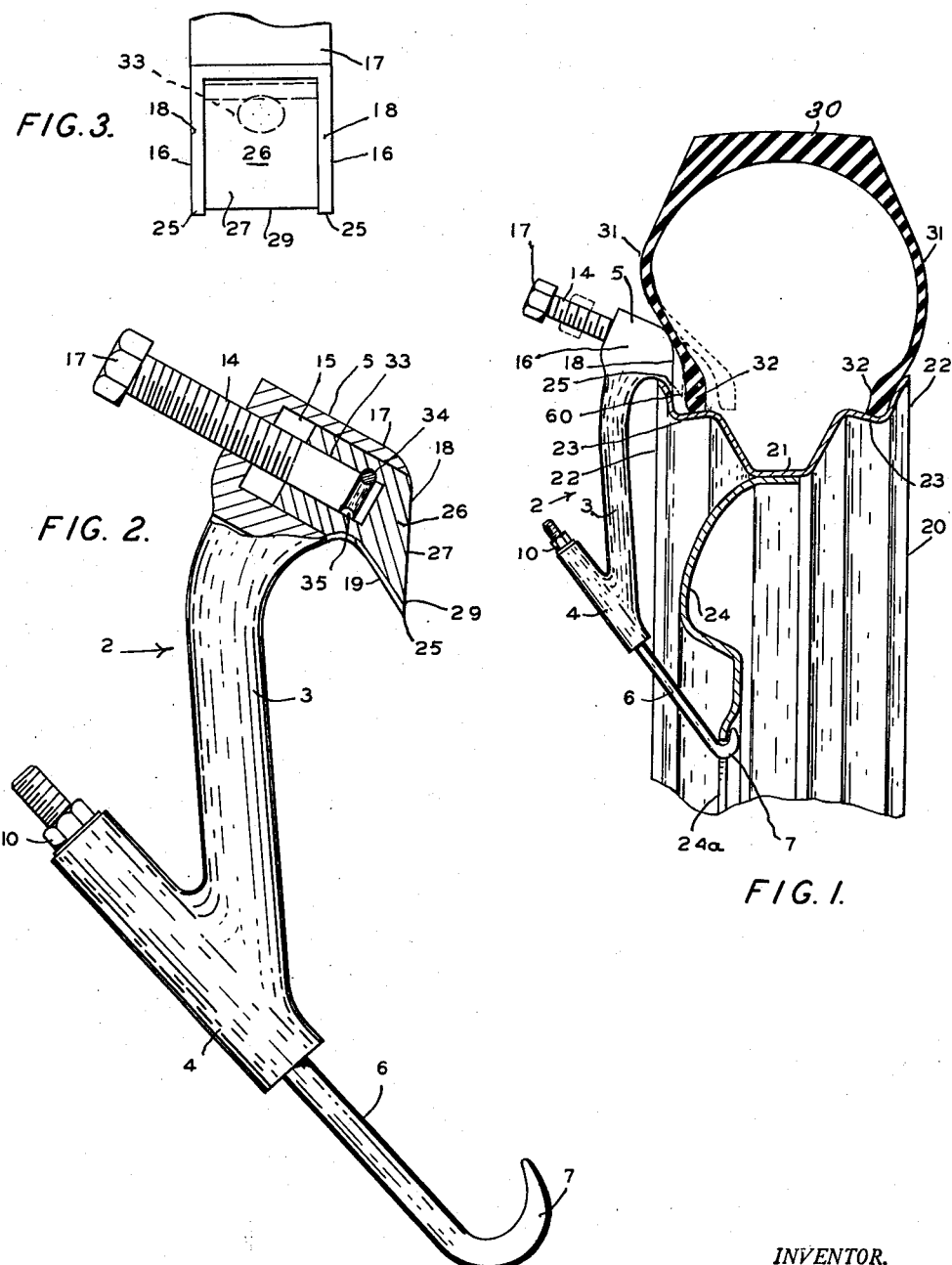
INVENTOR.
CLAUDE E. CALVIN Patented July 27, 1954

2,684,710

UNITED STATES PATENT OFFICE 2,684,710

SCREW ACTUATED TIRE BEAD LOOSENING TOOL

Claude E. Calvin, Maricopa County, Ariz.

Application July 21, 1952, Serial No. 299,946

1 Claim. (Cl. 157—1.17)

This invention concerns a safety rim tire removing tool for rims integral with wheel disks.

When drop center rims were first brought on the market they were considered to be an improvement over the previously used split rims. In time, however, it was found that when a blowout occurred the tires loosened from the rims too easily and were likely to be thrown off before the automobile could be brought to a stop. A new hazard was thus introduced. To overcome this the so called "safety" drop center rim has been developed. In this rim the beads of the tire casing are caused to grip the outer portions of the rim so firmly that the casing remains in place on the rim even though completely deflated. One way of attaining this effect has been to form troughs adjacent the rim edges to receive the tire beads and to detain them from working into the drop center groove when the tire became deflated. However, as a result of the tight gripping of the casing beads on the rim, and the detention of these beads in these troughs, the casing became increasingly hard to remove. This was particularly true if the casing had been set on the rim for a long time and allowed to "freeze" or rust in place. The usual tools previously used to remove casings were then found to be inadequate and new types of tools have been suggested. Most of these, however, have faults and are not entirely successful.

To overcome these difficulties I have developed a new and improved tire casing removing tool one of the objects of which is to provide an attaching clamp which will secure the tool on the rim and wheel disk, combined with a bead forcer which will press the tire bead and side wall directly inward toward the drop center from the rim flange with a steady regulatable pressure and without damaging the material of the tire.

Another object is to provide a tire casing removing tool which has a shank body with a hook to engage an opening in the rim wheel disk, having a tightening nut, at one end, and a wedging hook-head at the other end which will hook over the edge of the rim flange and secure the tool in place on the rim, and will then bring a bead forcing wedge to bear on the side-wall and bead of the casing to force it inward toward the drop center.

Still another object is to provide a tire casing removing tool which has a body with a rim engaging double hook at the top and a screw hook at the bottom, arranged so that the screw hook will force the double engaging hook into position on the edge of the tire rim flange and wedge it between the rim edge flange and the side wall of the tire thereon, and will then press a forcing element directly inward on the side wall by means of a large screw having a combined wrench and hammer head to enable the user to strike the screw on its outer end and provide shock sufficient to dislodge frozen beads.

Other objects will appear hereinafter.

I attain the foregoing objects by means of the devices, parts and combinations of parts illustrated in the accompanying drawings, in which—

Figure 1 is a side elevation of my tool as applied to a safety drop center tire rim having an integral wheel disk;

Figure 2 is a side elevation of the tool drawn on an enlarged scale, with parts broken away to show interior construction; and Figure 3 is an end view of the hook head portion of the tool.

Similar numerals refer to similar parts in the several views.

In the drawings numeral 2 indicates generally my improved tire casing removing tool, and 20 indicates a drop center rim of the "safety" type, having a drop center groove 21, rim flanges 22, bead retaining troughs 23, and a centrally disposed wheel disk 24 with a hub hole 24a. A tire casing 30 is mounted on rim 20 and has side walls 31 and beads 32 which fit into troughs 23.

The tool 2 is composed of an elongated cylindrical body 3 which has an angularly disposed tubular slide 4 at its lower end, and an angularly disposed hook head 5 at its top end. Both the slide and the hook head extend inwardly and downwardly relative to body 3, when applied to a vertically positioned wheel as viewed in Figures 1 and 2 and both are in the same plane with said body. A threaded wheel engaging hook 6 is slidably retained in slide 4. Hook 7 on its inner end is proportioned to engage the center hole 24a of wheel disk 24. The threaded portion on its outer end receives clamping nut 10.

The outer portion of hook head 5 is centrally bored and threaded to receive forcing screw 14. The inner portion of this hook has a downwardly opening C channel section with side flanks 16 joined at the top by web portion 17. The side flanks are shaped so that their inner faces 18 slant upwardly and slightly outwardly. The under faces 19 of flanks 16 are shaped to slant upwardly and outwardly in angular relation to their front inner faces 18 so that the angle between them forms points 25 which will hook on to the rim flange 22 and wedge between the tire side wall 31 and the rim flange.

Within the channel space 15 of head 5, and between the side flanks 16 and the top web portion 17 there is a forcing wedge block 26. This has a front inner face 27 which is angularly pitched to extend substantially parallel to the inner faces 18 of flanks 16, and an under face 28 substantially parallel to the corresponding under faces 19 of flanks 16. These faces join to form wedge point 29. The outer end portion of this block has a bore 33 to receive the inner end of forcing screw 14 which is retained in the block by cross pin 34 engaging in annular groove 35 formed near the inner end of this screw. Wedge block 26 is slidably retained in the C channel 15 of the hook head and the flanks and web act as guides and keep it from turning when screw 14 is turned. A striking and wrench head 17 is provided at the outer end of forcing screw 14.

In use the tool is applied to a rim as shown in Figure 1 by, first, engaging hook 6 on the edge of hole 24a, and then the hook points 25 of head 5 over the rim flange 22. Clamping nut 10 is then tightened until these hook points are forced downwardly between the tire side wall 31 and the rim flange 22. This action not only opens a space between the side wall and the rim flange, but tightly clamps the tool 2 on the rim and wheel disk. When the tool has been thus clamped and secured the forcing wedge block 26 is advanced toward the lower edge of the tire side wall, as shown by dotted lines 60, Figure 1, by rotating forcing screw 14 in head 5. Any suitable wrench (not shown) may be used for this purpose. Wedge block 26 then moves inwardly and slightly downward so that its wedge point 29 bearing against the lower part of side wall 31 forces bead 32 out of rim trough 23 and toward drop center groove 21 until it will drop into it. Since the front face 27 of block 26 is substantially parallel to the side wall 31 at the place of contact the forcing pressure is applied directly and does not cause chafing or abraiding of the material of the casing at said place of contact or otherwise. Obviously, after the tool has been applide to one place on the rim it may be moved to other positions around the rim and the operation repeated.

Whereas the several parts composing the device are subject to variation in shape and design, the following claim is intended to include all such variations which remain within the spirit of the invention.

I claim:

A safety rim tire removing tool consisting of a vertically extending elongated body having an angularly slanting hook head at its upper end, an angularly disposed tubular slide at its lower end extending in the same plane and in substantially the same direction relative to said body; a threaded wheel engaging hook slidably retained in said slide having a clamping nut threaded on its outer end and a hook to engage a hole in a wheel disk at its inner end, the outer portion of said hook head being threaded to receive a forcing screw and its inner portion being a channel guide opening toward the lower end of said body, and having side flanks joined to a top web with their under and inner faces angularly disposed forming hooks to engage the flange of a rim from which a tire is to be removed; a forcing wedge block slidably operating in said channel guide having a front face disposed to bear on the side wall of a tire casing on said rim with a lower hook edge to engage said rim flange coincidentally with said channel guide hooks, when drawn into said channel guide; and a forcing screw threaded into the outer portion of said hook head with its inner end rotatably connected to said forcing block, and having a striking and wrench head at its outer end, arranged to force said wedge block outward from said channel guide and force its front face against the side wall of a tire on said rim, while the hooks on said side flanks engage over said rim.

References Cited in the file of this patent

UNITED STATES PATENTS

| Number | Name | Date |
|---|---|---|
| 1,519,558 | Snider | Dec. 16, 1924 |
| 1,639,887 | Hatfield | Aug. 23, 1927 |
| 2,122,388 | Wilkerson | June 28, 1938 |
| 2,367,638 | McCulloch | Jan. 16, 1945 |
| 2,489,088 | Hewitt | Nov. 22, 1949 |
| 2,495,117 | McCollister | Jan. 17, 1950 |
| 2,501,225 | Kuhlmann | Mar. 21, 1950 |
| 2,520,330 | Northrup et al. | Aug. 29, 1950 |
| 2,606,602 | Manupello | Aug. 12, 1952 |
| 2,621,715 | Lien et al. | Dec. 16, 1952 |